United States Patent
Mangold et al.

(10) Patent No.: US 6,217,060 B1
(45) Date of Patent: Apr. 17, 2001

(54) DEVICE FOR INFLATING A VEHICLE OCCUPANT RESTRAINT SYSTEM

(75) Inventors: Rolf Mangold, Tierhaupten; Anton Fischer, Leinweiler, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/466,459

(22) Filed: Dec. 17, 1999

(30) Foreign Application Priority Data

Dec. 18, 1998 (DE) .......................................... 298 22 617 U

(51) Int. Cl.⁷ .................................................... B60R 21/16
(52) U.S. Cl. ...................... 280/730.2; 280/737; 280/741
(58) Field of Search ................................ 280/730.2, 737, 280/741

(56) References Cited

U.S. PATENT DOCUMENTS

| | | | |
|---|---|---|---|
| 3,884,497 | * 5/1975 | Massengill et al. ................. | 280/737 |
| 5,582,806 | * 12/1996 | Skanberg et al. ..................... | 280/737 |
| 5,709,406 | * 1/1998 | Buchanan ............................. | 280/737 |
| 5,755,457 | * 5/1998 | Specht ............................... | 280/730.2 |
| 5,820,161 | * 10/1998 | Svensson ............................. | 280/737 |

* cited by examiner

Primary Examiner—Kenneth R. Rice
(74) Attorney, Agent, or Firm—Tarolli, Sundheim, Covell, Tummino & Szabo L.L.P.

(57) ABSTRACT

The invention relates to a device for inflating a vehicle occupant restraint system of a vehicle, in particular for inflating a gas bag. The device comprises a gas generator which contains a pyrotechnic propellant material and is provided for developing a first gas. The device further comprises a compressed gas container arranged so as to be separate from the gas generator and containing a second gas which is under pressure. The gas generator and the compressed gas container are activated in a case of restraint and introduce the first and second gases, respectively, into the vehicle occupant restraint system. The invention further relates to a vehicle occupant restraint system, comprising a head/side gas bag and the device for inflating the gas bag.

14 Claims, 1 Drawing Sheet

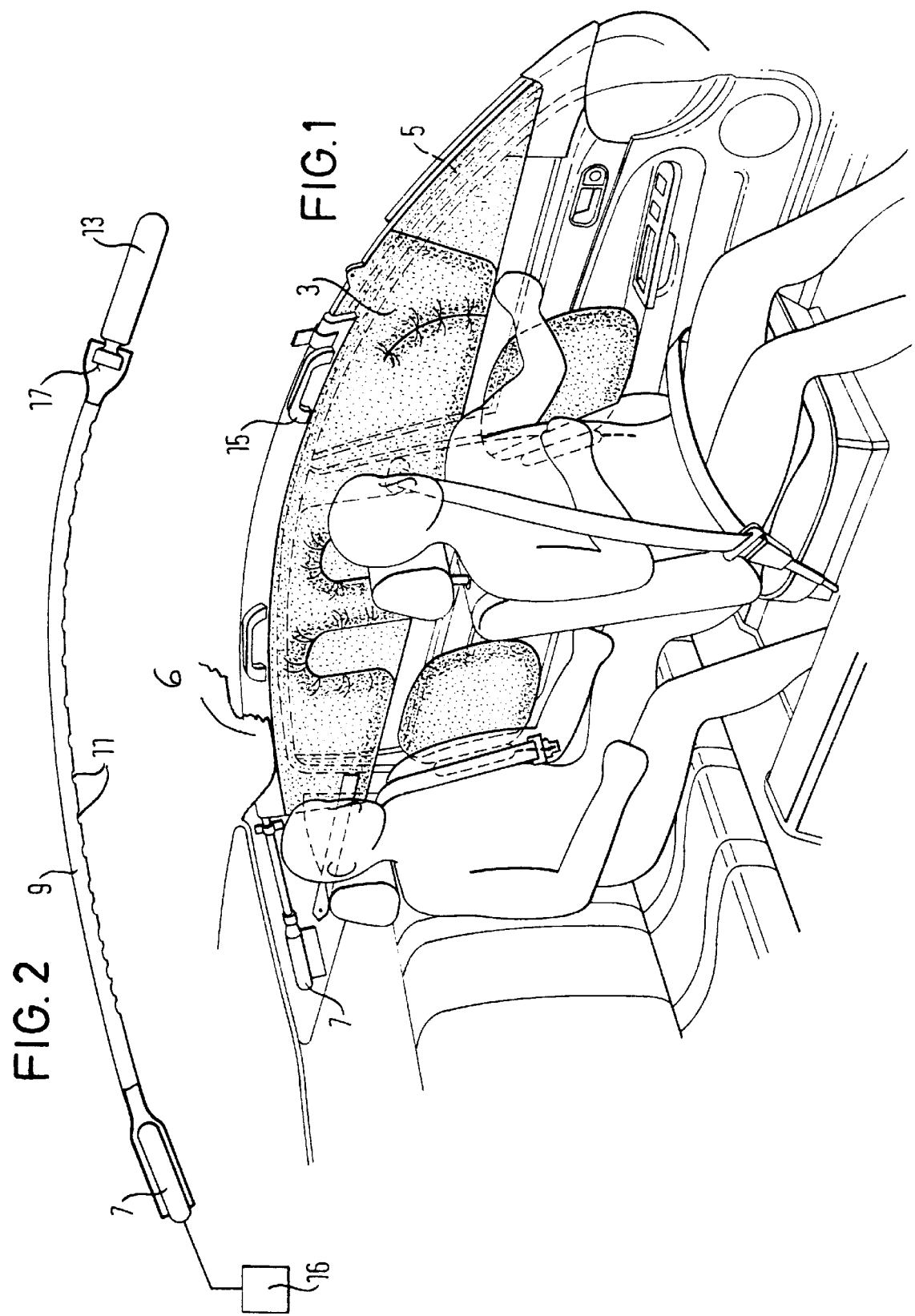

DEVICE FOR INFLATING A VEHICLE OCCUPANT RESTRAINT SYSTEM

TECHNICAL FIELD

The invention relates to a device for inflating a vehicle occupant restraint system, in particular for inflating a gas bag. The invention further relates to a vehicle occupant restraint system comprising a head/side gas bag and the device for inflating the gas bag.

BACKGROUND OF THE INVENTION

To inflate a gas bag or to actuate another vehicle occupant restraint system, various systems are known, namely for example a pyrotechnic gas generator, which in the case of restraint rapidly generates gas. Furthermore, there are so-called hybrid gas generators which contain a pyrotechnic propellant material as well as compressed gas in the same housing. The quantity of gas which becomes free must be coordinated precisely with the restraint system. This means that for each restraint system, its own gas generator is developed, which is very costly. The possibility of varying the generated gas quantity by means of the filling amount of the propellant material only permits limited possibilities for variation.

BRIEF SUMMARY OF THE INVENTION

The invention provides a device which makes possible an easy varying of the gas quantity which becomes free, so that it can be adapted to the restraint system in an optimum manner without a high expenditure. This is achieved in a device comprising a gas generator which contains a pyrotechnic propellant material and is provided for developing a first gas. The device further comprises a compressed gas container arranged so as to be separate from the gas generator and containing a second gas which is under pressure. The gas generator and the compressed gas container are activated in a case of restraint and introduce the first and second gases, respectively, into the vehicle occupant restraint system. The device according to the invention provides two separate containers for the gas generator containing pyrotechnic propellant material and for the compressed gas container and thereby differs from hybrid gas generators known hitherto. The separating of the device into two different containers offers the advantage that through different and differently filled compressed gas containers the device can be adapted to the restraint system very easily and at a favorable cost. Compressed gas containers are in fact very cheap in their manufacture and filling, in contrast with gas generators containing pyrotechnic propellant material. Furthermore, the filling level of the compressed gas container can be varied very greatly in a simple manner. A manufacturer of devices according to the invention can thereby use the same gas generator for various restraint systems and can adapt the entire device individually to the restraint system merely by the addition of different compressed gas containers.

Preferably the gas generator and the compressed gas container are flowingly connected with each other by means of a gas pipe. This also ensures that the first gas generated by the gas generator and the second gas from the compressed gas container can mix with each other. The mixed gas then has a lower temperature and has less thermal stress on the restraint system.

According to a preferred embodiment, the first gas developing on activation of the gas generator flows to the compressed gas container and opens the latter. It is thereby sufficient to only activate the gas generator; the opening of the compressed gas container takes place automatically.

The gas pipe, via which the gas generator and the compressed gas container are connected, can also be provided with outflow openings via which the first gas of the gas generator and the second gas of the compressed gas container flows into the restraint system, in order to inflate the common gas bag. With this embodiment, only one common gas pipe for the gas generator and the compressed gas source is necessary. The gas pipe has a dual function, by also acting as a gas-distributing diffuser body.

The gas pipe can be an elongated body, at the opposite axial ends of which on the one hand the gas generator is connected and on the other hand the compressed gas container.

The elongated body can be curved in a bow shape, in particular when the device serves for the unfolding of a so-called head/side gas bag, also designated a window bag. Then the elongated body can in fact be adapted to the course of the roof frame to which it is fastened.

The invention further relates to an occupant restraint system for a vehicle, the occupant restraint system comprising a head/side gas bag which in the case of restraint covers at least regions of the side windows of the vehicle. The restraint system in addition comprises the device for inflating the gas bag, the device comprising a gas generator which contains a pyrotechnic propellant material and is provided for developing a first gas, and a compressed gas container arranged so as to be separate from the gas generator and containing a second gas which is under pressure, the gas generator and the compressed gas container being activated in a case of restraint and introducing the first and second gases, respectively, into the head/side gas bag, the gas bag being arranged in a non-activated state under the roof frame lining. When a head/side gas bag is provided which extends from a side of a front occupant to a side of a rear occupant, the already previously mentioned gas pipe is provided, via which gas is blown into the interior of the gas bag.

To accommodate the device more easily, at one axial end of the gas pipe the gas generator is provided, and at the other end the compressed gas container is provided. Thereby, gas flows via both ends into the interior of the gas bag and not only from one end. Both the section of the gas bag for the front occupant of the vehicle and also the section for the rear occupant of the vehicle is thereby inflated quickly and approximately simultaneously. If gas flows into the gas pipe only from one axial end, then in contrast to this at the opposite end gas will be available with a delay.

BRIEF DESCRIPTION OF THE DRAWINGS

FIG. 1 shows a side view of an occupant restraint system according to the invention in inflated state together with the device according to the invention for its inflation, the device being shown in installed state; and FIG. 2 shows the device shown in FIG. 1, without roof frame lining.

DETAILED DESCRIPTION OF THE PREFERRED EMBODIMENT

In FIG. 1 an occupant restraint system for a vehicle is illustrated. This has a head/side gas bag 3, which in inflated state covers the side windows both of the front occupant and also of the rear occupant. In the folded state, the head/side gas bag 3 extends parallel to the roof frame 5 and is also fastened thereto. However, it is not visible from the exterior through a roof frame lining 6 which is partly shown in FIG. 1.

The occupant restraint system additionally comprises a device for inflating the gas bag 3, which is illustrated in detail in FIG. 2. The device consists of a so-called tubular gas generator 7 which contains a pyrotechnic propellant material. The tubular gas generator 7 is accommodated on the termination of the roof frame 5 in the region of the rear column (cf. FIG. 1). A gas pipe 9, constructed as an elongated body, at the one axial end of which the gas generator 7 is connected, extends parallel to the roof frame and into the head/side gas bag 3. In the region in which the gas pipe runs in the head/side gas bag 3, numerous outflow openings 11 are present. A compressed gas container 13 sits at the other axial end. The gas generator 7 and the compressed gas container 13 are connected with the interior of the gas pipe 9 and are thereby flowingly connected with each other. The compressed gas container 13 is arranged in the region of the front hand grip 15 concealed beneath the roof frame lining.

In the case of restraint, the gas generator 7 is activated by a control unit 16. The first gas developing thereby arrives into the gas pipe 9, flows partially via the outflow openings 11 into the gas bag and unfolds the latter. A first pressure wave, however, arrives directly at the compressed gas container 13, where it strikes onto its end 17 on the end face. The compressed gas container 13 is designed at the end 17 so that it in fact withstands the pressure of the gas contained in it, but not the pressure wave generated by the gas generator 7. Through the pressure wave, it is opened at its end 17, so that the second gas which is under pressure flows into the gas pipe 9. In the gas pipe 9 the second, compressed gas mixes with the first, hot gas originating form the gas generator 7. The gas bag 3 is inflated uniformly and unfolds from top to bottom.

When a gas bag 3 with a different cross-section or with a different filling volume is to be installed, the adapting of the device can take place simply in that a different compressed gas container 13 with a different volume or with a different filling level is inserted into the remainder of the device.

The gas pipe 9 can be of flexible material which adapts itself to the course of the roof frame 5 on fastening, so that also with regard to the gas pipe 9 only slight alterations are necessary on adapting to a different restraint system.

Gas generator 7 and container 13 may also be arranged at the opposite axial ends of the gas pipe 9 with respect to the arrangement shown in FIG. 2. This further embodiment is substantially a mirror image of the embodiment according to FIG. 2.

What is claimed is:

1. A device for inflating a vehicle occupant restraint system, in particular for inflating a gas bag, said device comprising
   a gas generator which contains a pyrotechnic propellant material and is provided for developing a first gas, and
   a compressed gas container arranged so as to be separate from said gas generator and containing a second gas which is under pressure,
      said gas generator and said compressed gas container being activated in a case of restraint and introducing said first and second gases, respectively, into said vehicle occupant restraint system.

2. The device according to claim 1, wherein a gas pipe is provided via which said compressed gas container and said gas generator are flowingly connected with each other.

3. The device according to claim 2, wherein said first gas developing on activation of said gas generator flows to said compressed gas container and opens the latter.

4. The device according to claim 2, wherein said gas pipe has opposite ends and outflow openings, via which outflow openings said first gas of said gas generator and said second gas of said compressed gas container flows into said vehicle occupant restraint system.

5. The device according to claim 2, wherein said restraint system comprises said gas bag, wherein said gas pipe is flowingly connected with an interior of said gas bag and wherein said gas generator and said compressed gas container commonly inflate said gas bag.

6. The device according to claim 1, wherein said gas pipe is an elongated body and said gas generator and said compressed gas container are each arranged at said opposite ends of said gas pipe.

7. The device according to claim 1, wherein a vehicle in which said device is arranged has a roof frame and wherein said gas pipe is an elongated body curved in a bow shape, the course of which elongated body is adapted to a course of said roof frame of said vehicle.

8. An occupant restraint system for a vehicle, which vehicle has a roof frame, a roof frame lining, side windows as well as an A-column and a rear column, said occupant restraint system comprising
   a head/side gas bag which in a case of restraint covers at least regions of said side windows of said vehicle, and
   a device for inflating said gas bag, said device comprising
      a gas generator which contains a pyrotechnic propellant material and is provided for developing a first gas, and
      a compressed gas container arranged so as to be separate from said gas generator and containing a second gas which is under pressure,
      said gas generator and said compressed gas container being activated in a case of restraint and introducing said first and second gases, respectively, into said head/side gas bag,
      said head/side gas bag being arranged in a non-activated state under said roof frame lining.

9. The occupant restraint system according to claim 8, wherein said head/side gas bag extends from at least a side of a front occupant to at least a side of a rear occupant and wherein said device has a gas pipe via which gas flows into an interior of said head/side gas bag, and wherein said gas pipe is constructed as an elongated curved body, said elongated curved body being adapted to a course of said roof frame.

10. The occupant restraint system according to claim 9, wherein said gas pipe has axial ends which terminate in a region of said A-column of said vehicle.

11. The occupant restraint system according to claim 9, wherein said gas pipe has axial ends which terminate in a region of said rear column of said vehicle.

12. The occupant restraint system according to claim 9, wherein at least one of said gas generator and said compressed gas container is accommodated in said region of said A-column of said vehicle.

13. The occupant restraint system according to claim 9, wherein at least one of said gas generator and said compressed gas container is accommodated in said region of said rear column of said vehicle.

14. The occupant restraint system according to claim 8, wherein said restraint system comprises said gas bag, wherein said gas pipe is flowingly connected with the interior of said gas bag and wherein said gas generator and said compressed gas container commonly inflate said gas bag.

* * * * *